US008843245B2

(12) United States Patent
Choe et al.

(10) Patent No.: US 8,843,245 B2
(45) Date of Patent: Sep. 23, 2014

(54) ROBOT CLEANER AND REMOTE MONITORING SYSTEM USING THE SAME

(75) Inventors: Suuk Choe, Seoul (KR); Younggie Kim, Guri (KR); Jeongsuk Yoon, Seoul (KR); Seongsoo Lee, Suwon (KR); Junho Jang, Seoul (KR); Sangik Na, Seoul (KR); Yiebin Kim, Seoul (KR); Donghoon Yi, Seoul (KR); Seungmin Baek, Yongin (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 13/093,403

(22) Filed: Apr. 25, 2011

(65) Prior Publication Data
US 2011/0264305 A1 Oct. 27, 2011

(30) Foreign Application Priority Data

Apr. 26, 2010 (KR) ........................ 10-2010-0038631

(51) Int. Cl.
G05D 1/00 (2006.01)
G05D 1/02 (2006.01)
(52) U.S. Cl.
CPC ............ G05D 1/0274 (2013.01); G05D 1/0246 (2013.01); G05D 2201/0203 (2013.01)
USPC ........ 701/2; 701/23; 701/25; 701/26; 701/28; 700/65; 700/214; 700/245; 700/253; 700/264
(58) Field of Classification Search
CPC ...................................................... G05D 1/00
USPC ........ 701/2, 28, 23, 25, 26; 700/65, 245, 214, 700/253, 264
See application file for complete search history.

(56) References Cited

U.S. PATENT DOCUMENTS

| 7,274,166 | B2 * | 9/2007 | Kim .......................... 318/568.12 |
| 7,805,220 | B2 * | 9/2010 | Taylor et al. .................. 700/253 |
| 8,195,331 | B2 * | 6/2012 | Myeong et al. ............... 700/245 |
| 2001/0037163 | A1 * | 11/2001 | Allard ........................... 700/245 |
| 2004/0083570 | A1 * | 5/2004 | Song et al. ...................... 15/319 |
| 2004/0167688 | A1 * | 8/2004 | Karlsson et al. ................ 701/23 |
| 2004/0204792 | A1 * | 10/2004 | Taylor et al. .................. 700/245 |

(Continued)

FOREIGN PATENT DOCUMENTS

| JP | 2001-209426 | 8/2001 |
| JP | 2002-325708 | 11/2002 |

(Continued)

OTHER PUBLICATIONS

Japanese Office Action dated Jul. 17, 2012.

(Continued)

*Primary Examiner* — John R Olszewski
*Assistant Examiner* — Truc M Do
(74) *Attorney, Agent, or Firm* — KED & Associates LLP (57) ABSTRACT

A robot cleaner has a camera to generate an image of a cleaning area, a controller to prepare a cleaning map based on the image and to drive a robot cleaner, and a communicator to transmit the image and cleaning map to an external device and to receive a control command from the external device. The image and map may be transmitted over a local or wide area network, and the external device may be a computer, television, smart phone, portable phone, or other type of wireless access device.

16 Claims, 8 Drawing Sheets

(56) References Cited

U.S. PATENT DOCUMENTS

| | | | |
|---|---|---|---|
| 2005/0010331 A1* | 1/2005 | Taylor et al. | 700/245 |
| 2005/0166355 A1* | 8/2005 | Tani | 15/319 |
| 2005/0171636 A1* | 8/2005 | Tani | 700/245 |
| 2005/0171644 A1* | 8/2005 | Tani | 700/253 |
| 2005/0267631 A1* | 12/2005 | Lee et al. | 700/245 |
| 2005/0287038 A1* | 12/2005 | Dubrovsky et al. | 422/63 |
| 2006/0020369 A1* | 1/2006 | Taylor et al. | 700/245 |
| 2006/0061657 A1* | 3/2006 | Rew et al. | 348/151 |
| 2006/0111811 A1* | 5/2006 | Okamoto et al. | 700/214 |
| 2006/0196003 A1* | 9/2006 | Song et al. | 15/319 |
| 2007/0061040 A1* | 3/2007 | Augenbraun et al. | 700/245 |
| 2007/0150094 A1* | 6/2007 | Huang et al. | 700/245 |
| 2008/0082208 A1* | 4/2008 | Hong et al. | 700/245 |
| 2008/0172146 A1* | 7/2008 | Lin | 700/245 |
| 2009/0182464 A1* | 7/2009 | Myeong et al. | 701/25 |
| 2010/0082193 A1* | 4/2010 | Chiappetta | 701/24 |
| 2010/0228394 A1* | 9/2010 | Yi et al. | 700/253 |

FOREIGN PATENT DOCUMENTS

| | | |
|---|---|---|
| JP | 2003-204297 | 7/2003 |
| JP | 2003-256041 | 9/2003 |
| JP | 2005-339408 | 12/2005 |
| JP | 2006-285547 | 10/2006 |
| JP | 2007-226322 | 9/2007 |
| JP | 2008-080474 | 4/2008 |
| JP | 2008-234636 | 10/2008 |
| JP | 2009-070228 | 4/2009 |

OTHER PUBLICATIONS

Japanese Office Action for Application 2011-098621 dated May 28, 2013 and partial English translation.

* cited by examiner

ROBOT CLEANER AND REMOTE MONITORING SYSTEM USING THE SAME

CROSS-REFERENCE TO RELATED APPLICATIONS

Pursuant to 35 U.S.C. §119(a), this application claims the benefit of earlier filing date and right of priority to Korean Application No. 10-2010-0038631 filed on Apr. 26, 2010, the contents of which are incorporated herein by reference.

BACKGROUND

1. Field

One or more embodiments described herein relate to a robotic cleaner.

2. Background

Robots have been developed for industrial use in factory automation, as well as for medical and aerospace purposes. Recently, the use of robots in the home has garnered particular attention. An example of a home robot is a robot cleaner, which is a kind of home appliance that suctions dirt off the floor while traveling within a predetermined area. The robot cleaner is provided with a rechargeable battery and a sensor to avoid obstacles while traveling.

More recently, remote monitoring technology based on a communication network has been used to control these cleaners. In spite of these developments, improvements are needed.

DETAILED DESCRIPTION

Figure 3:
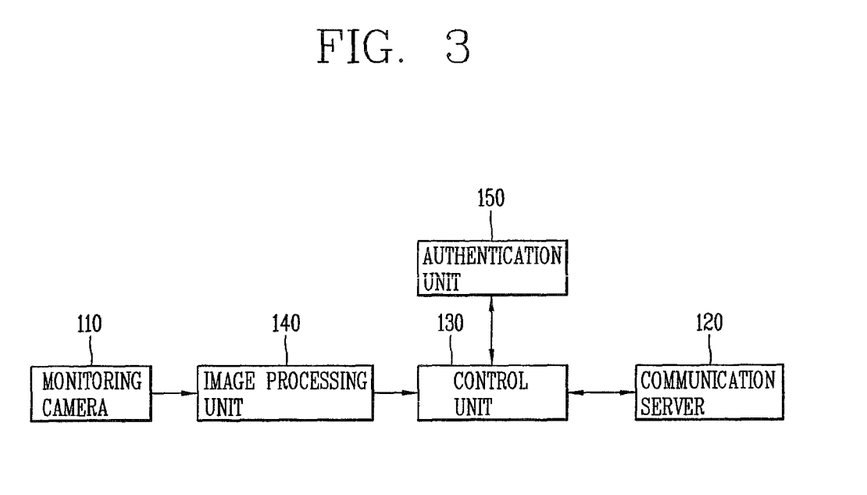
FIG. 3 shows an internal configuration of a robot cleaner.

FIG. 3 shows one embodiment of a robot cleaner which includes one or more monitoring cameras 110, a control unit 130, and a communication server 120.

Figure 1:
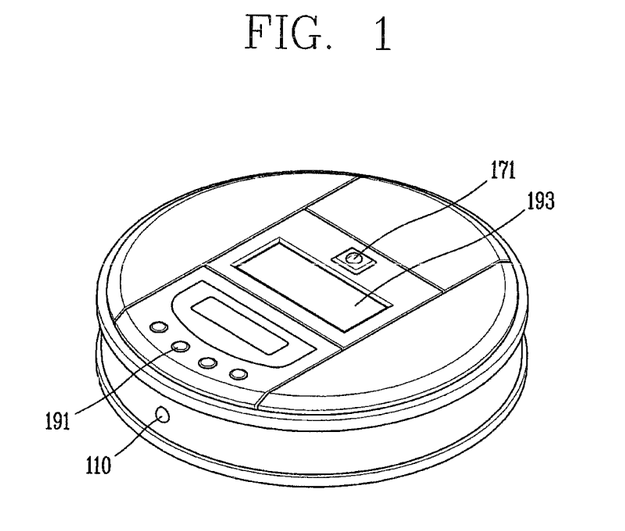
FIG. 1 shows one embodiment of a robot cleaner.

The one or more monitoring cameras 110 capture a cleaning area to generate a monitoring image. The monitoring camera 110, as illustrated in FIG. 1, is typically provided at a front surface or lateral surface of the robot cleaner. The monitoring camera captures a cleaning area while traveling or cleaning. According to circumstances, it may be provided at an upper portion of the robot cleaner.

In case where the robot cleaner has a plurality of cameras, the plurality of cameras may be formed at a lateral surface of the robot cleaner with a predetermined distance or predetermined angle. The robot cleaner may further include a lens connected to the monitoring camera 110 to adjust the focus of a subject, a positioning unit for positioning a camera, and a lens positioning unit for positioning the lens. The robot cleaner may be provided with a multiplexer (not shown) in addition to a plurality of monitoring camera 110. Here, the multiplexer selects and outputs one of monitoring images generated from the plurality of monitoring cameras 110 according to a drive signal of the control unit 130.

The communication server 120 transmits the monitoring image and the cleaning map to an external device and receives a control command from the external device. The communication server 120 streaming-transmits the monitoring image to the connected external device. At this time, the communication server 120 transmits the monitoring image according to a request of the external device. In other words, the communication server 120 checks that the external device is accessed to the robot cleaner and then transmits the monitoring image.

For another example, the communication server 120 may be always in a standby state to transfer surrounding images captured through the monitoring camera 110 to an external device. Furthermore, the communication server receives a control command and transfers the received control command to the control unit 130. Here, the control command is a control command for driving a robot cleaner, or a command for controlling the image detection unit 110. For example, the control command is a command for checking the status information of the robot cleaner, various stored or detected information, a command for driving each unit or the like. The communication server 120 may include a wireless access module, for example, a Wi-Fi module, connected to a wireless access device such as an access point (AP) which will be described later.

The control unit 130 drives a robot cleaner and searches for the cleaning area to prepare a cleaning map. The control unit 130 controls the operation of the robot cleaner based on the user's command received through its own built-in algorithm, a program stored in the storage unit which will be described later, an input unit, or the like. The control unit controls the operation of the monitoring camera 110 and takes part in the operation of transmitting a cleaning map and a monitoring image to an external device through the communication server 120.

Furthermore, the control unit 130 drives the monitoring camera 110 for each unit which will be described later based on a control command transmitted from the external device.

Furthermore, the control unit 130 searches for a cleaning area to prepare a cleaning map. The communication server 120 transmits the cleaning map prepared by the control unit 130 to the connected external device.

Furthermore, the communication server 120 transmits information such as a cleaned area, a non-cleaned area, a cleaning pattern, a cleaning-disabled region, a cleaning status, and the like to the external device.

Operation of the control unit 130 to extract a characteristic point from an image captured by an upward camera will now be described.

The control unit 130, for example, extracts a characteristic point using natural marks such as a fluorescent lamp, an interior structure, and the like, which exist in the upper region including a ceiling. The characteristic point extraction operation may be carried out by capturing the upper part once and then extracting a characteristic point. In other embodiments, more than one characteristic point may be extracted from the same or different images at the same or different times while still or during movement.

First, the robot cleaner captures an image of an upper part including, for example, a ceiling at a first time and a second time, respectively, through the upward camera during movement. The image may include a plurality of marks, for example, two marks including a first mark located at the ceiling and a second mark located at the ceiling or another position within the image. At this time, the first and the second mark in an image signal captured at the first time represent a first and a second characteristic point. On the other hand, the first and the second mark at the second time represent a third and a fourth characteristic point.

The control unit 130 matches the first characteristic point to the third characteristic point, and the second characteristic point to the fourth characteristic point, respectively, which are the characteristic points of the image signal for the first and the second mark, and compares each other to calculate a moving distance.

In other words, the characteristic points of the image information captured at the first and the second time are compared with each other to calculate a moving distance of the first mark based on the first and the third characteristic points, and a moving distance of the second mark based on the third and the fourth characteristic points.

At this time, moving distances between the first and the second mark and the robot cleaner based on the movement of the robot cleaner are constant and the same as an actual moving distance of the robot cleaner. However, moving distances of the characteristic points may be different from one another. The moving distance of the characteristic point for a mark decreases as increasing the distance of the mark, whereas the moving distance difference of characteristic points increases as located close to the robot cleaner, i.e., as located at a surface of the wall lower than the ceiling.

Accordingly, if the movement ratio of the characteristic point based on the movement of the robot cleaner is greater than a predetermined value like the second mark, then the control unit 130 determines it as an unnecessary characteristic point and removes it.

Furthermore, since the first mark between the first and the second mark is located at the ceiling, the control unit 130 calculates a height of the second mark using a distance from the robot cleaner to the ceiling. If the calculated height is equal to or less than a reference height, then the control unit 130 determines it as an unnecessary characteristic point and removes it. The moving distance of the first mark and the moving distance of the second mark may be proportional to a ratio of actual moving distance to height of the first and the second mark and the robot cleaner.

At this time, since the actual moving distance is the same and the height for the first mark is a height of the ceiling, it may be possible to calculate a height for the second mark. Here, it is determined that a characteristic point located at a central portion in the captured image is located at the ceiling, and a height of the characteristic point is calculated on the basis of the characteristic point located at the central portion.

Then, the control unit 130 concurrently performs location recognition and cleaning map generation using simultaneous localization and mapping (SLAM). The characteristic point extraction operation illustrates an example thereof, and an algorithm for the characteristic point extraction operation or an algorithm for performing location recognition and cleaning map preparation may be changed based on the situation where the robot cleaner is placed, the configuration of the robot cleaner, and the like.

Referring to FIG. 3, the robot cleaner may further include an image processing unit 140 for compressing the monitoring image. The image processing unit 140 compresses a monitoring image outputted from the image detection unit 110 using a compression technique such as audio video interleaved (AVI), advanced streaming format (ASF) and the like. In particular, the image processing unit 140 may be an MPEG encoder.

The robot cleaner may further include an authentication unit 150 for permitting or blocking access to the external device. The authentication unit 150 may be provided in the form of an authentication server. The authentication unit may store authentication information for the external device, for example, information capable of identifying the external device such as phone number, user ID, password, address, and the like.

According to another example, as will be described in greater detail later, when the robot cleaner has a storage unit as a separate module, the authentication unit 150 may store authentication information for the external device in the storage unit. At this time, if the external device requests authentication or access, then the authentication unit 150 reads information for the external device from the storage unit, and then permits authentication or access to the external device. The technologies for the method of authentication are publicly known.

Figure 5:
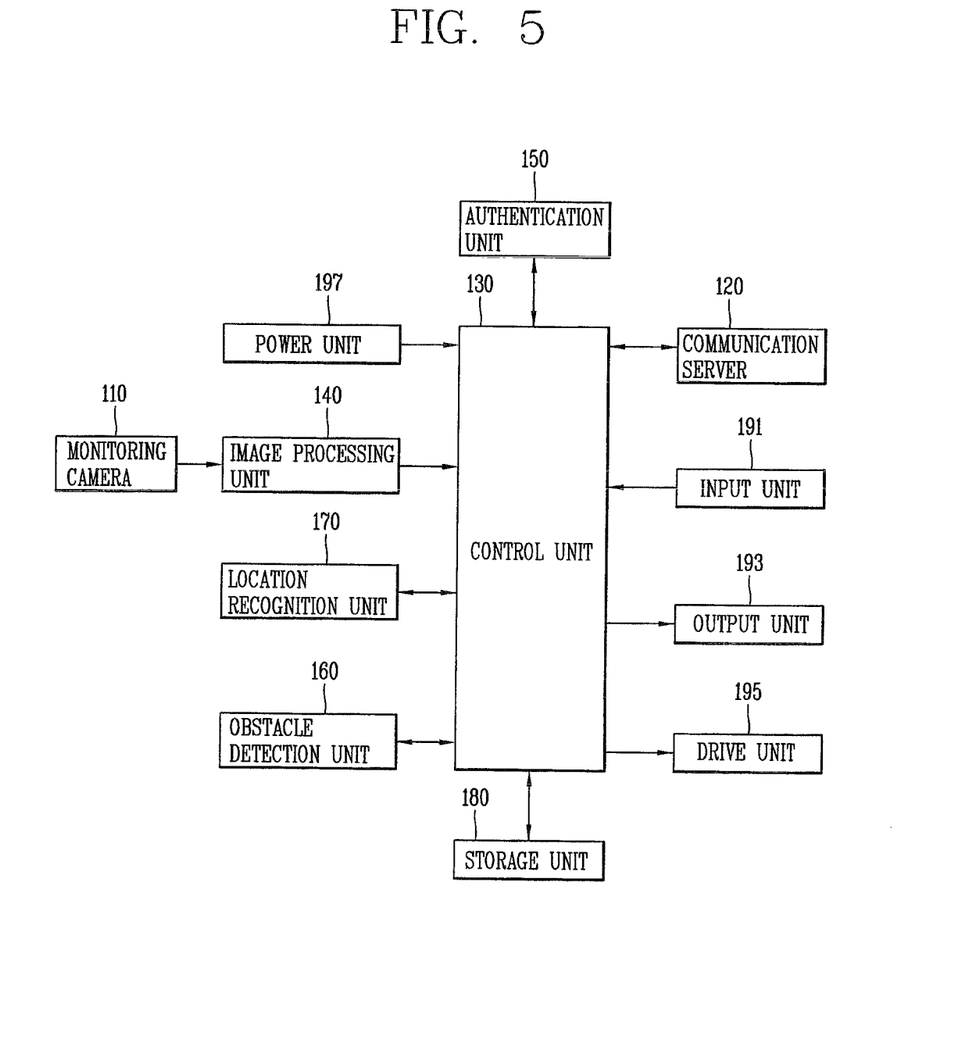
FIG. 5 shows another embodiment of a robot cleaner.

Referring to FIG. 5, a robot cleaner according to another embodiment may include one or more monitoring cameras 110, a control unit 130, a communication server 120, an obstacle detection unit 160, and a location recognition unit 170. Here, the robot cleaner generates a cleaning map based on the obstacle and its own location.

One or more monitoring cameras 110 capture a cleaning area to generate a monitoring image. The control unit 130 drives the robot cleaner, and searches for the cleaning area to prepare a cleaning map. The communication server 120 transmits the monitoring image and the cleaning map to an external device and receives a control command from the external device.

The obstacle detection unit 160 detects an obstacle in the vicinity of the robot cleaner while moving within a cleaning area or performing cleaning. The obstacle detection unit outputs the existence or non-existence of the obstacle, the location thereof, the size thereof, or the like to the control unit 130. For the obstacle detection unit 160, an infrared sensor, an ultrasonic sensor, radio frequency (RF) sensor, a bumper, or the like may be used. The control unit 130 checks a cleaning area based on the obstacle information outputted from the obstacle detection unit 160.

The location recognition unit 170 is provided with one or more distance sensors to recognize the location of the robot cleaner within the cleaning area. Here, for the location recognition unit 170, at least one of an acceleration sensor for detecting the speed and location, an encoder connected to a wheel motor for driving a wheel of the robot cleaner, and a gyro sensor for detecting the rotation speed of the robot cleaner may be used.

Furthermore, an upward camera 171 provided at an upper portion of the robot cleaner to capture the upper part and output an upper image may be used for the location recognition unit 170. The operation of extracting a characteristic point and preparing a cleaning map using the upward camera 171 will be replaced with the description of the robot cleaner according to one embodiment.

The control unit 130 prepares a cleaning map using location information recognized through the location recognition unit 170, or using together with the obstacle information. Furthermore, the control unit 130 modifies or complements the prepared cleaning map using the location information and the obstacle information.

Referring to FIG. 5, the robot cleaner may further include a storage unit 180 for storing at least one of the monitoring image or compressed monitoring image, authentication information on the external device, information on the obstacle, information on the location of the robot cleaner, and the cleaning map.

The storage unit 180 stores a monitoring image detected through the monitoring camera 110, information on a monitoring image compressed through the image processing unit 140, authentication information on the external device, namely, wireless terminal device or wireless access device.

Furthermore, the storage unit 180 stores at least one of obstacle information such as the location of the obstacle detected through the obstacle detection unit 160 while moving or cleaning, and a cleaning map prepared through the control unit 130. A non-volatile memory is primarily used for the storage unit 180. Here, the non-volatile memory (NVM, NVRAM) is a storage device in which stored information continues to be maintained without being supplied with power. For example, the non-volatile memory may include ROM, flash memory, magnetic computer storage device (for example, hard disc, diskette drive, magnetic tape), optical disc drive, magnetic RAM, PRAM, and the like.

Referring to FIG. 5, a robot cleaner according to embodiments may further include a power unit 197, a drive unit 195, an input unit 191, and an output unit 193. The power unit 197 is provided with a rechargeable power supply means to supply power within the robot cleaner. The power unit supplies operating power while performing cleaning, and if the power remaining amount is insufficient, then the charge current is supplied from the charging station to be charged.

The drive unit 195 drives a wheel to move the robot cleaner. The drive unit is connected to multiple wheels including a plurality of main wheels and one or more auxiliary wheels. Furthermore, the drive unit is provided with a specified wheel motor for rotating the wheels to drive the wheel motor, thereby moving the robot cleaner.

The input unit 191 is provided with one or more buttons to directly receive a control command. The user or the like directly inputs a control command to the robot cleaner through the input unit 191. Furthermore, the user or the like may input a command for outputting one or more information from the information that has been stored in the storage unit 180 through the input unit.

The input unit 191 may include one or more input buttons. For example, the input buttons may include a check button for inputting a command to check location information such as information for a monitoring image, authentication information for an external device, the location of obstacles, the location of the robot cleaner, and the like, or check a cleaning area or cleaning map, a configure button for inputting a configuration command, a reconfigure button for inputting a reconfiguration command, a delete button, a cleaning start button, a stop button, and the like.

The output unit 193 outputs at least one of the monitoring image or compressed monitoring image, authentication information on the external device, information on the obstacle, information on the location of the robot cleaner, and the cleaning map. The output unit 193 outputs information for a monitoring image stored in the storage unit 180, information on an external device, obstacle information or information on a cleaning area, information detected or recognized through the obstacle detection unit 160 or the location recognition unit 170, a cleaning map prepared through the control unit 130.

The output unit 193 may further display status information such as a current status of each unit constituting the robot cleaner, a current cleaning status, and the like. The output unit 193 may be formed with any one of a light emitting diode (LED), a liquid crystal display (LCD), a plasma display panel, and an organic light emitting diode (OLED). Here, the input unit 191 and output unit 193 may have the form of a touch screen capable of performing both input and output.

The robot cleaner may include a cleaning unit (not shown), and the cleaning unit is provided with a specific suction motor for sucking air and a means for condensing dust to suck surrounding dust or foreign substances.

Figure 2:
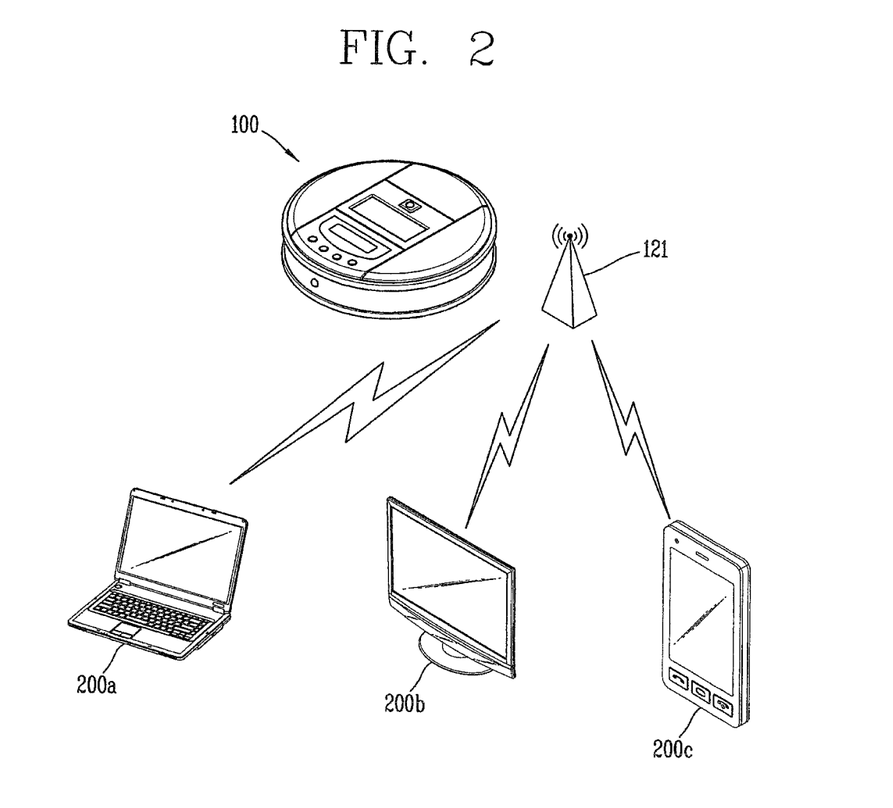
FIG. 2 shows a remote monitoring system for a robot cleaner.

Referring to FIG. 2, a remote monitoring system according to an embodiment may include a robot cleaner 100 and a wireless terminal device 200. The robot cleaner 100 searches for a cleaning area to prepare a cleaning map, and captures the cleaning area to generate a monitoring image.

The wireless terminal device 200 accesses the robot cleaner to receive the monitoring image and the cleaning map from the robot cleaner and transmit a control command to the robot cleaner. Here, the wireless terminal device 200 may include at least one of wireless communication-enabled devices, such as a computer, a television, a smart television, a smart phone, and a portable phone. Hereinafter, the description of the robot cleaner will be replaced with the description of FIG. 3 or 5, and therefore, will be omitted below.

The control command may include at least one of a control command for the monitoring camera such as zoom-in/zoom-out, tilting, and the like, a select command, and a control command for the robot cleaner.

Furthermore, the control command may include a command for checking various stored or detected information such as the status information of the robot cleaner, a command for driving each unit, or the like.

Furthermore, the wireless terminal device 200 displays a cleaning map received from the robot cleaner 100 to check a cleaned area, a non-cleaned area, and the like, and selects a desired location or area on the cleaning map to move the robot cleaner to the relevant location or the relevant area, or generates a control command for requesting a monitoring image for the relevant location or the relevant area to transmit to the robot cleaner.

Figure 4:
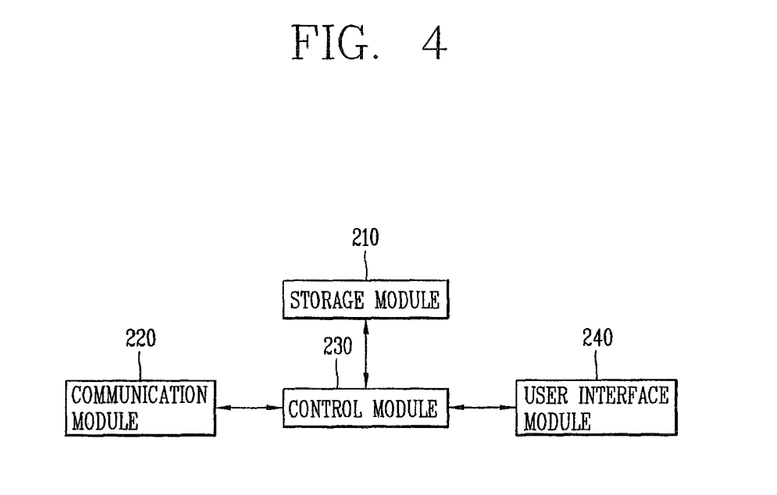
FIG. 4 shows a wireless terminal device for a robot cleaner.

Referring to FIG. 4, the wireless terminal device 200 may include a storage module 210, a control module 230, and a communication module 220. The storage module 210 stores a remote monitoring program. The control module 230 executes the remote monitoring program and generates the control command. The communication module 220 receives the monitoring image and cleaning map from the robot cleaner and transmits the control command to the robot cleaner.

Furthermore, the wireless terminal device may further include a user interface module 240 for displaying the cleaning map or the monitoring image and receiving the control command.

In FIG. 2, the wireless terminal device 200 is directly connected to the image processing unit 140 within the robot cleaner in the form of a Wi-Fi Direct network to transmit and receive data. The communication module 220 is connected to the communication server 120 to receive a cleaning map or monitoring image from the communication server 120. Furthermore, the communication module transmits a control command generated from the control module 230 to the communication server 120.

First, the wireless terminal device 200 accesses the robot cleaner 100 and then requests the cleaning map or the monitoring image to the robot cleaner 100 to receive it. FIG. 2 illustrates a form in which the wireless terminal device 200 and the robot cleaner 100 are connected to each other through ad-hoc networking.

The wireless terminal device 200 provides the cleaning map or the monitoring image transmitted by the robot cleaner to the user or the like through the user interface module 240. When the robot cleaner is provided with the authentication unit 150, first, the communication module 220 requests access and authentication to the robot cleaner to the authentication unit 150. The authentication unit 150 compares information on the wireless terminal device 200 therewith to determine and permit access thereto. If access is permitted (authenticated), then the wireless terminal device 200 requests the transmission of a cleaning map to the robot cleaner 100.

When the communication module 220 receives the cleaning map, the user interface module 240 displays the cleaning map. The user or the like checks a cleaned area, a non-cleaned area, and the like through the cleaning map displayed on the user interface module 240.

Furthermore, the user or the like inputs a command for allowing the robot cleaner to be moved to a desired location or area through the cleaning map, or a command for allowing the relevant location or area to be cleaned through the user interface module 240. If the user or the like selects a specific location or area on the cleaning map, then the wireless terminal device displays a monitoring image corresponding to this. Furthermore, the user or the like selects a specific location or area, then the wireless terminal device generates a command for requesting a monitoring image for the relevant location or area.

The control module 230 receives the user command to generate a control command such as a control command for the robot cleaner, a status check command, a monitoring camera control command, and the like. The communication module 220 transmits the control command to the communication server.

Figure 8:
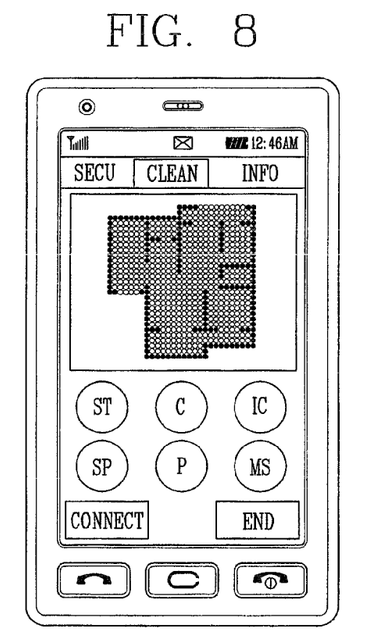
FIG. 8 shows an example of a screen of a wireless terminal device for controlling a robot cleaner in cleaning mode.
Figure 9:
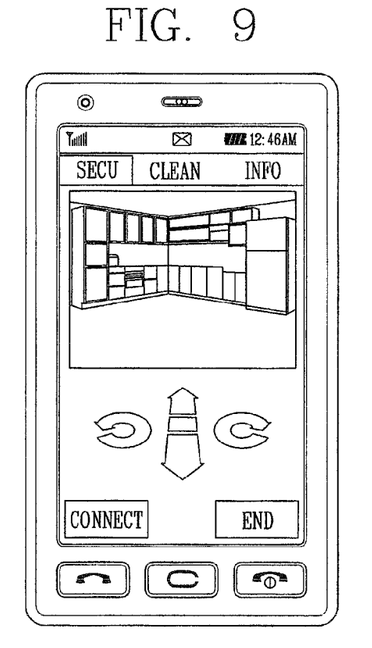
FIG. 9 shows an example of a screen of a wireless terminal for controlling a robot cleaner in security mode.

FIGS. 8 and 9 are views illustrating an example of a user interface screen for allowing the wireless terminal device to control the robot cleaner. When the user wants to monitor the inside of the room where a robot cleaner is placed using the robot cleaner or perform cleaning on the wireless terminal device 200, first, the user executes a remote monitoring program stored in the storage module 210.

As shown in FIGS. 8 and 9, screens in which a remote monitoring program in a security mode, a cleaning mode, and an information check mode capable of checking information is carried out.

Referring to FIG. 8, the wireless terminal device displays a cleaning map received from the robot cleaner in a cleaning mode on the user interface module 240. The user interface module 240 may include a plurality of buttons such as start, end, charge, cleaning pattern setting, and the like, to receive a command for controlling the robot cleaner from the user or the like.

When the user or the like wants to see a monitoring image for a specific location or area on the displayed cleaning map, as illustrated in FIG. 9, the wireless terminal device 200 is switched to a security mode. If the user or the like selects a specific location or area on the cleaning map, then the wireless terminal device displays a monitoring image corresponding to this.

Furthermore, if the user or the like selects a specific location or area on the cleaning map, then the wireless terminal device generates a command for requesting a monitoring image for the relevant location or area. If the wireless terminal device 200 requests a monitoring image for a specific location or area desired by the user or the like to the robot cleaner 100, then the robot cleaner transmits the monitoring image corresponding to the relevant location or area to the wireless terminal device. At this time, if the robot cleaner is not placed at the relevant location, then it is moved to the relevant location to generate and transmit a monitoring image for the relevant location.

As illustrated in FIG. 9, the wireless terminal device may receive a command for controlling a monitoring camera through the user interface module 240.

Figure 6:
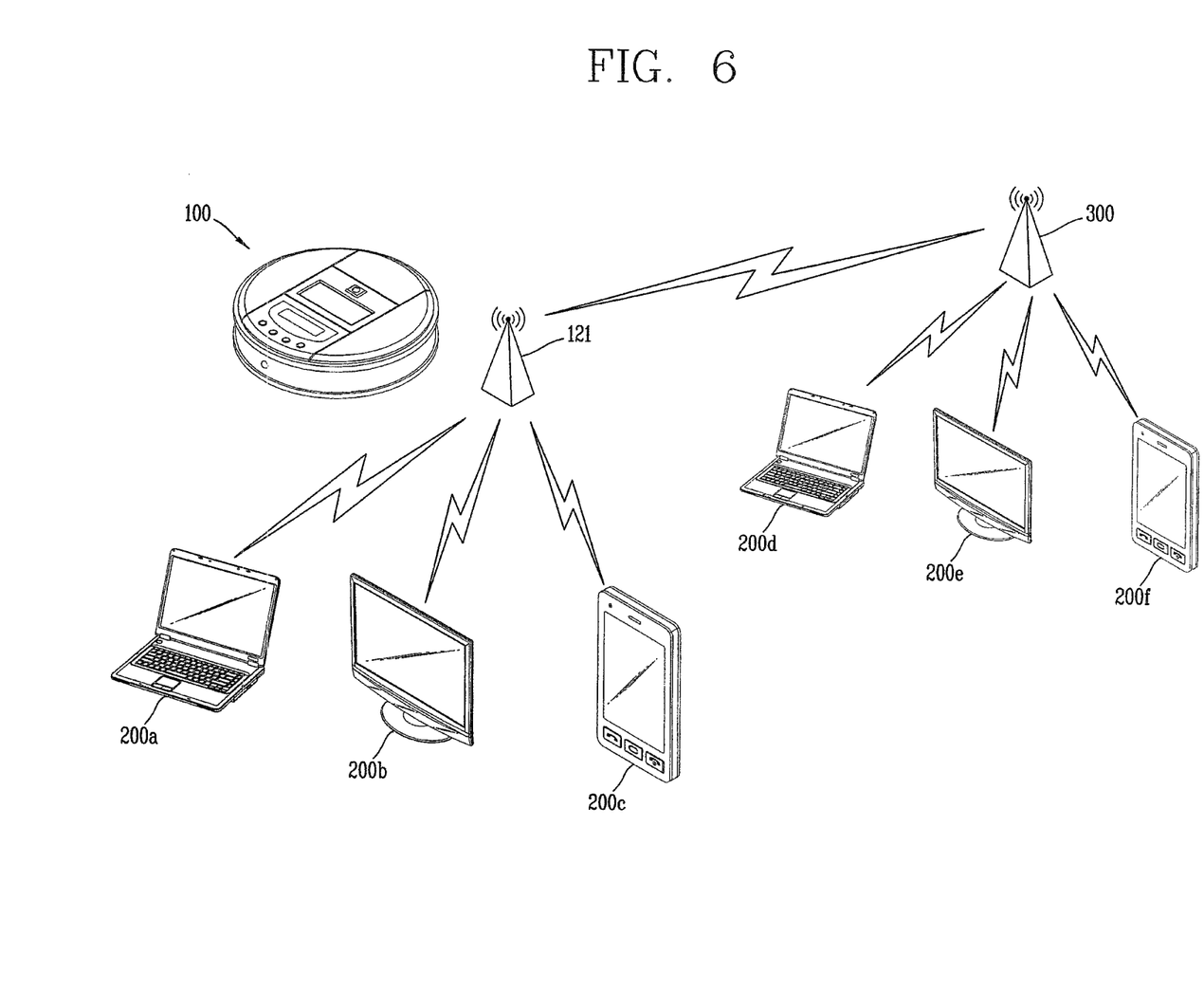
FIG. 6 shows another remote monitoring system for a robot cleaner based on a local area network.

Referring to FIG. 6, a remote monitoring system according to another embodiment may include a robot cleaner 100 and a wireless terminal device 200, and the wireless terminal device 200 is connected to the robot cleaner 100 through the wireless access device 300. The robot cleaner 100 searches for a cleaning area to prepare a cleaning map, and captures the cleaning area to generate a monitoring image.

The wireless terminal device 200 accesses the robot cleaner to receive the monitoring image and the cleaning map from the robot cleaner and transmit a control command to the robot cleaner. Here, the wireless terminal device 200 may include at least one of wireless communication-enabled devices, such as a computer, a television, a smart television, a smart phone, and a portable phone. The wireless access device 300 is a device such as an access point (AP) for connecting the robot cleaner 100 to the wireless terminal device 200. Hereinafter, the description of the robot cleaner will be replaced with the description of FIG. 3 or 5, and therefore, will be omitted below.

FIG. 6 illustrates a form in which the wireless terminal device 200 and the robot cleaner 100 are connected to each other through a local area network. In other words, the wireless terminal device 200 is mounted with a wireless communication module, for example, a Wi-Fi module. The wireless terminal device is connected to the communication server 140 or authentication unit 150 in the robot cleaner 100 without having a separate server.

The wireless terminal device 200 connected to the robot cleaner 100 through the wireless access device 300 to receive a monitoring image or cleaning map and transmit a control command. An example of the description and operation for the detailed configuration of the wireless terminal device in a remote monitoring system according to another embodiment will be replaced with the description of FIGS. 4, 8, and 9 in a remote monitoring system according to the one embodiment, and therefore, will be omitted below.

Figure 7:
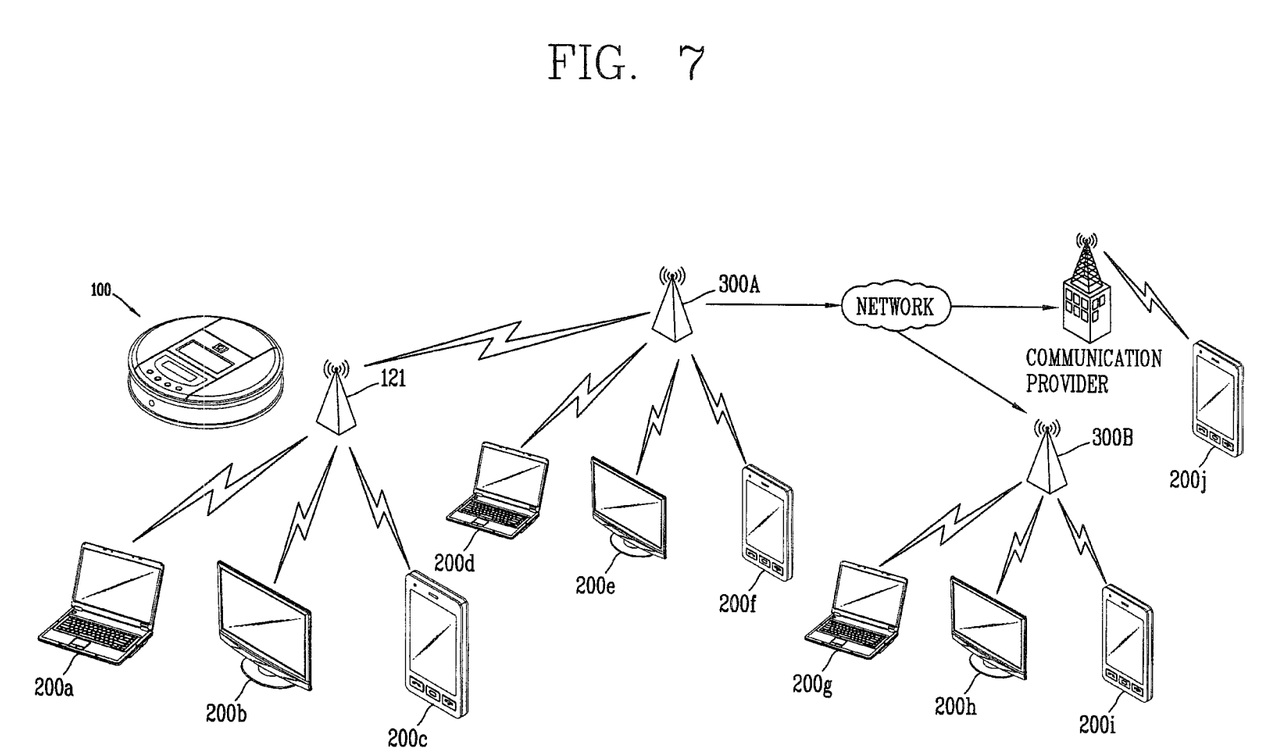
FIG. 7 shows another remote monitoring system for a robot cleaner based on a wide area network.

Referring to FIG. 7, a remote monitoring system according to still another embodiment may include a robot cleaner 100 for searching for a cleaning area to prepare a cleaning map and capturing the cleaning area to generate a monitoring image, and a wireless terminal device 200 for accessing the robot cleaner to receive the monitoring image and cleaning map and transmit a control command to the robot cleaner, and the wireless terminal device 200 is connected to the robot cleaner 100 through a network provided by a communication provider or the like.

At this time, according to circumstances, the remote monitoring system may further include a wireless access device 300. Here, the wireless terminal device 200 may include at least one of wireless communication-enabled devices, such as a computer, a television, a smart television, a smart phone, and a portable phone. The wireless access device 300 is a device such as an access point (AP) for connecting the robot cleaner 100 to the wireless terminal device 200. Hereinafter, the description of the robot cleaner will be replaced with the description of FIG. 3 or 5, and therefore, will be omitted below.

FIG. 6 is a view illustrating a form in which the wireless terminal device 200 and the content provider 10 are connected to each other in the environment of a wide area network. Referring to FIG. 6, the wireless terminal device 200 may include a public network accessible channel such as a mobile communication module, a wireless communication module, a modem, and the like. In other words, the wireless terminal device 200 is connected to a network through a channel provided by a communication provider or through a wireless access device.

The wireless terminal device is connected to the robot cleaner through a connected network to perform a remote monitoring operation such as providing a monitoring image through a user interface, or display a cleaning map. An example of the description and operation for the detailed configuration of the wireless terminal device in a remote monitoring system according to still another embodiment will be replaced with the description of FIGS. 4, 8, and 9 in a remote monitoring system according to the one embodiment, and therefore, will be omitted below.

A remote monitoring method of a remote monitoring system using a robot cleaner will be described with reference to FIGS. 10 and 11.

Figure 10:
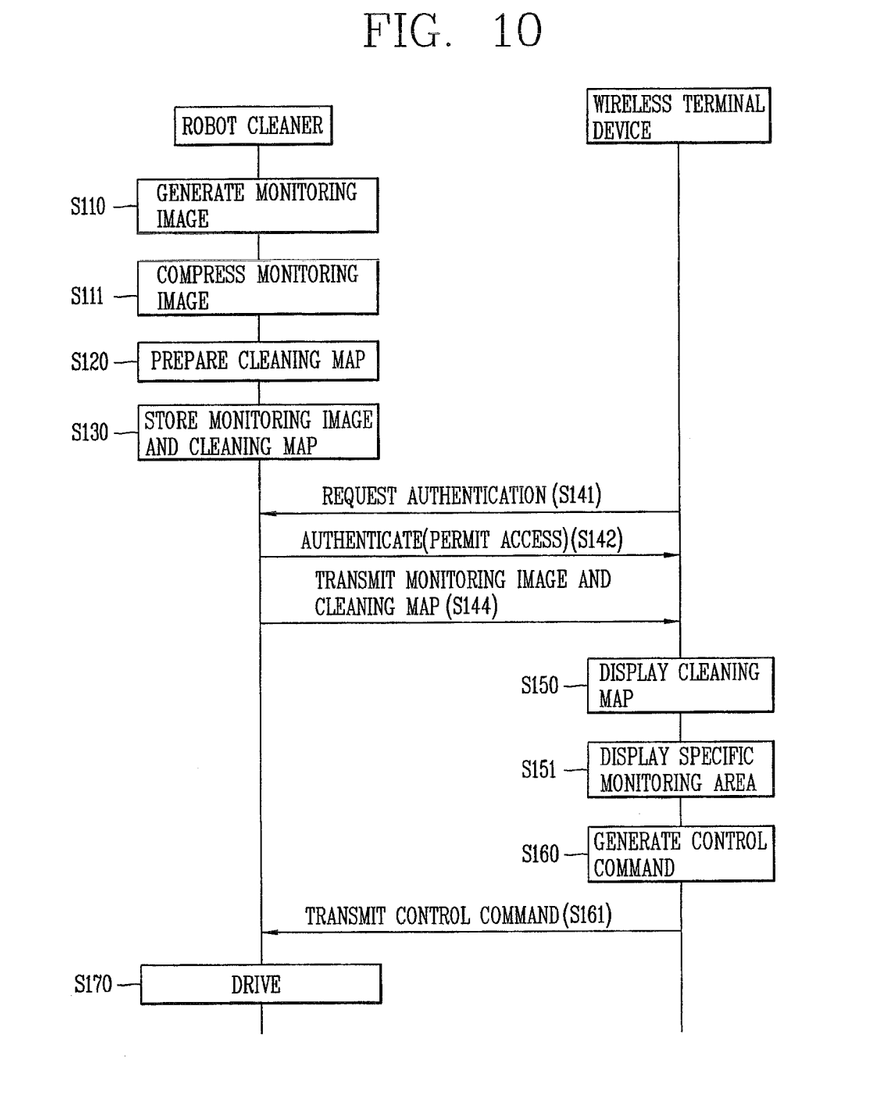
FIGS. 10 and 11 show steps included in one embodiment of a remote monitoring method for a robot cleaner.

Referring to FIG. 10, a remote monitoring method according to a remote monitoring system using a robot cleaner according to an embodiment may include allowing the robot cleaner to capture the cleaning area through the monitoring camera and generate a monitoring image (S110), allowing the robot cleaner to search for the cleaning area and prepare the cleaning map (S120), allowing the wireless terminal device to access the robot cleaner (S141), and allowing the robot cleaner to transmit the monitoring image and the cleaning map to the wireless terminal device when the wireless terminal device is accessed to the robot cleaner (S144).

Here, allowing the wireless terminal device to access the robot cleaner may include allowing the wireless terminal device to request authentication to the robot cleaner (S141), allowing the robot cleaner to determine whether the wireless terminal device is authenticated (not shown), and allowing the robot cleaner to permit access to the wireless terminal device as a result of determination (S142).

The remote monitoring method may further include allowing the robot cleaner to compress the monitoring image (S111) and storing the monitoring image, a compressed monitoring image, or a cleaning map (S130).

The remote monitoring method may further include allowing the wireless terminal device to display the cleaning map (S150) and allowing the wireless terminal device to display a monitoring image for the relevant location or area when a specific location or area is selected (S151). Furthermore, the remote monitoring method may further include allowing the wireless terminal device to generate a control command to the robot cleaner (S160), and allowing the wireless terminal device to transmit the control command to the robot cleaner (S161).

The robot cleaner 100 captures the vicinity through the monitoring camera 110 to acquire a monitoring image (S110). The image processing unit 140 compresses the monitoring image using a compression technique (S111), and the storage unit 180 stores the monitoring image or compressed monitoring image (S130). Furthermore, the robot cleaner 100 searches for a cleaning area to prepare a cleaning map (S120). The wireless terminal device 200 executes a remote monitoring program stored in the storage module 210, and then requests authentication to the communication terminal device through the communication server 120 or directly to the authentication unit 150 (S141).

The authentication unit 150 permits authentication using a database stored in the unit itself or information on an external device, namely, a wireless terminal device, stored in the storage unit 180 (S142). The wireless terminal device accessed to the robot cleaner requests a cleaning map and a monitoring image in a separate manner, or requests the transmission of a cleaning map and a monitoring image during the access to receive the cleaning map and monitoring image from the robot cleaner (S144). The wireless terminal device 200 displays the cleaning map received through the user interface module 240 (S150).

Furthermore, the wireless terminal device 200 displays a monitoring image for a specific location or area desired by the user or the like (S151). The wireless terminal device 200 receives a control command such as controlling the robot cleaner, manipulating a monitoring image screen, and the like, from the user or the like (S160). The wireless terminal device 200 transmits a control command received from the user or the like, or a control command generated by the device itself to the communication server 120 through the communication module 220.

The control unit 130 controls the robot cleaner or controls the operation of each unit based on the control command (S170). Here, the control command is at least one of control commands for the robot cleaner including a control command for the monitoring camera such as zoom-in/zoom-out, tilting, and the like, a select command, and a command for checking various stored or detected information such as the status information of the robot cleaner, a command for driving each unit, or the like.

Furthermore, the control command refers to a control command for selecting a desired location or area on the cleaning map to move the robot cleaner to the relevant location or the relevant area, or requesting a monitoring image for the relevant location or the relevant area.

Figure 11:
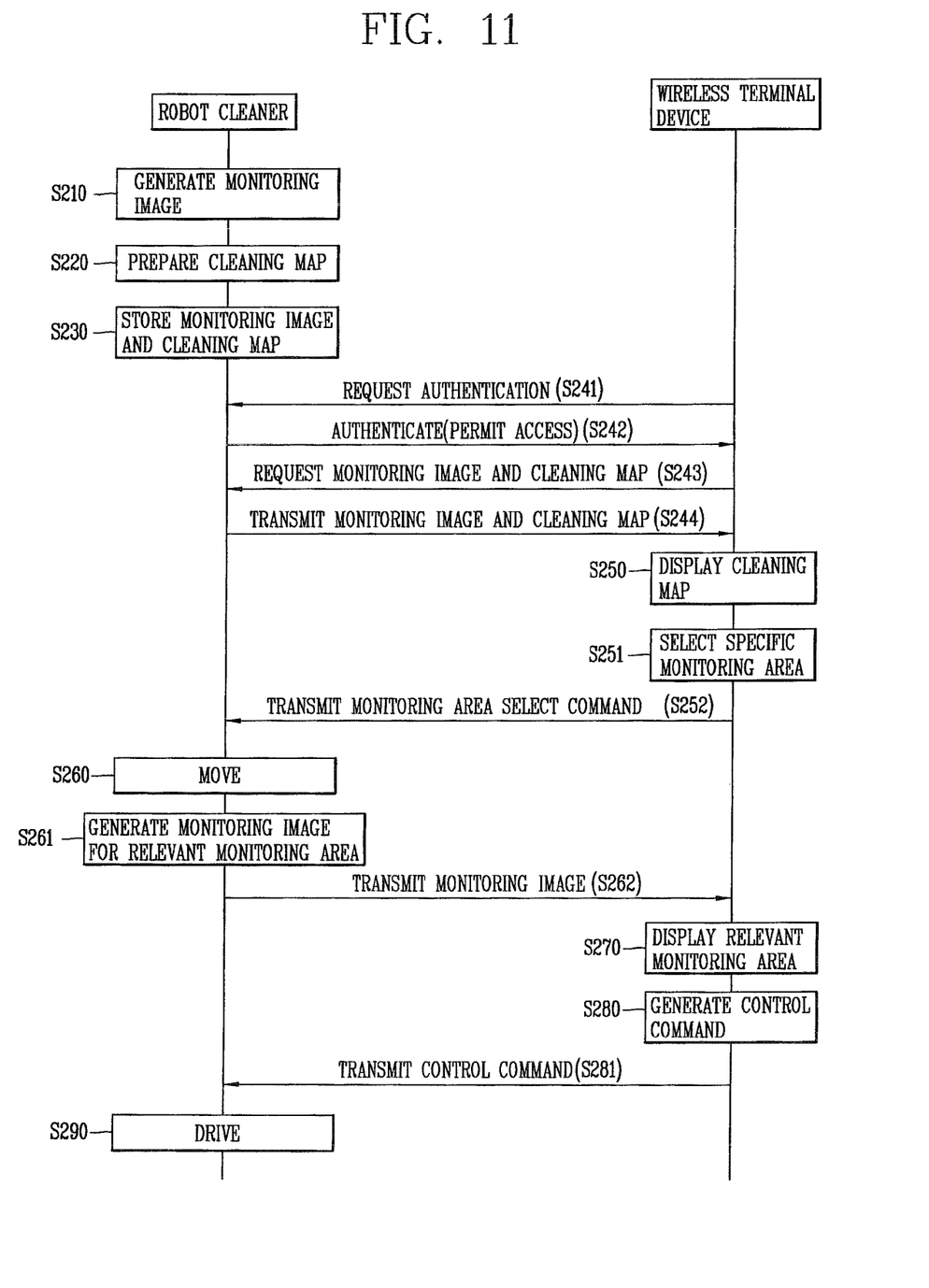

Referring to FIG. 11, a remote monitoring method according to a remote monitoring system using a robot cleaner according to another embodiment may include allowing the robot cleaner to capture the cleaning area through the monitoring camera and generate a monitoring image (S210), allowing the robot cleaner to search for the cleaning area and prepare the cleaning map (S220), allowing the wireless terminal device to access the robot cleaner (S241), and allowing the robot cleaner to transmit the monitoring image and the cleaning map to the wireless terminal device (S244) when the wireless terminal device is accessed to the robot cleaner and then the robot cleaner requests the transmission of the monitoring image and the cleaning map (S243).

Here, said allowing the wireless terminal device to access the robot cleaner may include allowing the wireless terminal device to request authentication to the robot cleaner (S241), allowing the robot cleaner to determine whether the wireless terminal device is authenticated (not shown), and allowing the robot cleaner to permit access to the wireless terminal device as a result of determination (S242).

The robot cleaner 100 captures the vicinity through the monitoring camera 110 to acquire a monitoring image (S210). The image processing unit 140 compresses the monitoring image using a compression technique (S211), and the storage unit 180 stores the monitoring image or compressed monitoring image (S230).

Furthermore, the robot cleaner 100 searches for a cleaning area to prepare a cleaning map (S220). The wireless terminal device 200 executes a remote monitoring program stored in the storage module 210, and then requests authentication to the communication terminal device through the communication server 120 or directly to the authentication unit 150 (S241). The authentication unit 150 permits authentication using a database stored in the unit itself or information on an external device, namely, a wireless terminal device, stored in the storage unit 180 (S242).

The wireless terminal device accessed to the robot cleaner requests a cleaning map and a monitoring image in a separate manner, or requests the transmission of a cleaning map and a monitoring image during the access to receive the cleaning map and monitoring image from the robot cleaner (S243, S244).

The wireless terminal device 200 displays the cleaning map received through the user interface module 240 (S250). The, if a command for selecting a specific location or area is received from the user or the like (S251), then the wireless terminal device transmits a control command for requesting a monitoring image for the relevant location or area (S252).

If the wireless terminal device has received a monitoring image for the relevant location or area in advance, then it may be displayed during the selection. If the wireless terminal device 200 requests a monitoring image for a specific location or area desired by the user or the like to the robot cleaner 100 (S252), then the robot cleaner transmits a monitoring image for the relevant location or area to the wireless terminal device (S262).

At this time, if the robot cleaner is not placed at the relevant location, then the robot cleaner moves to the relevant location to generate and transmit a monitoring image for the relevant location (S260, S261). The wireless terminal device displays the monitoring image for the relevant location or area through the user interface module 240 (S270). The wireless terminal device transmits a control command received from the user or the like or a control command generated by the device itself to the communication server 120 through the communication module 220 (S281). The control unit 130 controls the robot cleaner or the operation of each unit based on the control command (S290).

As described above, a robot cleaner according to embodiments, and a remote monitoring system using the same is provided with a robot cleaner for providing a cleaning map prepared while cleaning or traveling, and providing a monitoring image for a specific location or area, thereby controlling the robot cleaner to be moved to a specific location or area on the cleaning map, or performing cleaning for the relevant area. Furthermore, the embodiments provide a monitoring image for the relevant area, thereby enhancing the remote monitoring efficiency and system management efficiency and raising the user's convenience.

According to one or more of the aforementioned embodiments, one object is to provide a robot cleaner for searching for a cleaning area to prepare a cleaning map and a monitoring image.

According to one or more of the aforementioned embodiments, another object thereof is to provide a remote monitoring system using a robot cleaner capable of receiving a cleaning map prepared while cleaning or traveling to control the robot cleaner, and performing remote monitoring for a specific location or area.

According to one embodiment, a robot cleaner is arranged to operate with a server for remote monitoring, thereby providing a remote monitoring image without installing any other additional devices inside the room.

Another object is to provide a remote monitoring system performing remote monitoring using a household robot cleaner from a remote place without a home network system or separate relay server, and controlling the robot cleaner.

According to one embodiment, a robot cleaner may include one or more monitoring cameras configured to capture a cleaning area to generate a monitoring image, a control unit configured to drive a robot cleaner and search for the cleaning area to prepare a cleaning map, and a communication server configured to transmit the monitoring image and cleaning map to an external device and receive a control command from the external device. Furthermore, the robot cleaner may further include an authentication unit configured to permit or block access to the external device.

According to another embodiment, a remote monitoring system may include a robot cleaner configured to search for a cleaning area to prepare a cleaning map and capture the cleaning area to generate a monitoring image, and a wireless terminal device configured to access the robot cleaner to receive the monitoring image and the cleaning map from the robot cleaner and transmit a control command to the robot cleaner.

According to another embodiment, a remote monitoring system may include a wireless access device connected between the robot cleaner and wireless terminal device or connected to the robot cleaner and external network.

According to another embodiment, a remote monitoring method using a robot cleaner and a remote monitoring system is configured to search for a cleaning area to prepare a cleaning map, and a wireless terminal device configured to access the robot cleaner to receive the cleaning map and transmit a control command to the robot cleaner.

The method may further include allowing the robot cleaner to capture the cleaning area and generate a monitoring image, allowing the robot cleaner to search for the cleaning area and prepare the cleaning map, allowing the wireless terminal device to access the robot cleaner, and allowing the robot cleaner to transmit the monitoring image and the cleaning map to the wireless terminal device when the wireless terminal device is accessed to the robot cleaner.

According to another embodiment, a cleaning map is prepared while the robot cleaner cleans and/or travels, and a monitoring image is provided for a specific location or area, to thereby enhance the remote monitoring efficiency and promoting the user's convenience.

According to another embodiment, a robot cleaner may be controlled to be moved to a specific location or area on the cleaning map, or perform cleaning for the relevant area. Furthermore, according to the embodiments of the present disclosure, a monitoring image for the relevant area may be provided, thereby enhancing the system management efficiency.

According to another embodiment, a robot cleaner is incorporated or adapted to operate with a server for remote monitoring to provide a remote monitoring image, thereby minimizing the device configuration of a remote monitoring system, and simplifying the problems of installation and management.

According to one or more embodiments, the user or the like may access a robot cleaner through a wireless terminal device from a remote place to monitor the inside of the house. According to the embodiments of the present disclosure, a wireless access device is provided therewith to provide a remote monitoring image to a wireless terminal device using a wide area network as well as a local area network.

According one embodiment, a robot cleaner may be controlled through a wireless terminal device from a remote place to check the status of the robot cleaner and collect the information thereof. Also, the location thereof may be correctly recognized and corrected together with remote monitoring, thereby promoting the simplification of the system and the user's convenience.

In accordance with another embodiment, a robot cleaner includes a camera to generate an image of a cleaning area, a controller to prepare a cleaning map based on the image and to drive a robot cleaner, and a communicator to transmit the image and cleaning map to an external device and to receive a control command from the external device. The control command may control the camera or movement or orientation of the robot cleaner.

In addition, the robot cleaner may include an image processor to compress the image and cleaning map, an authenticator to permit or block access to the external device, a detector to detect an obstacle, and a location recognizer having at least one sensor to recognize a location of the robot cleaner. The controller may generate the cleaning map based on the detected obstacle and the location.

In addition, the robot cleaner may include a display to display at least one of the image, information corresponding to the obstacle, information corresponding to the location, authentication information on the external device, or the cleaning map.

In addition, the robot cleaner may include a storage unit to store at least one of the image, information corresponding to the obstacle, information corresponding to the location, authentication information on the external device, or the cleaning map.

In accordance with another embodiment, a system includes a robot cleaner to generate an image of a cleaning area and to prepare a cleaning map based on the image, and a wireless terminal to receive the image and cleaning map from the robot cleaner and to transmit a control command to the robot cleaner.

The robot cleaner may include at least one camera to capture the image of the cleaning area, a controller to generate the cleaning map from the image and to drive the robot cleaner, and a communicator to transmit the image and cleaning map to the wireless terminal and to receive the control command from the wireless terminal. The robot cleaner may also include an image processor to compress the image and cleaning map and an authenticator to permit or block access to the external device, as well as a detector to detect an obstacle and a location recognizes having at least one sensor to recognize a location of the robot cleaner. The controller may generate the cleaning map based on the detected obstacle and the location.

The wireless terminal device may include a storage module to store a remote monitoring program, a controller to implement the remote monitoring program and generate the control command, and a communicator to receive the image and cleaning map from the robot cleaner and to transmit the control command to the robot cleaner. The terminal may also include a user interface to display the cleaning map or the image and to receive the control command. The control command is to control the camera or movement or orientation of the robot cleaner.

In addition, the wireless terminal may display the image when a portion corresponding to a specific monitoring area in the cleaning map is selected while the cleaning map is displayed.

In addition, a wireless access device may be coupled between the robot cleaner and the wireless terminal or an external network. Also, the wireless terminal may be or include a computer, a television, a smart phone, a portable phone, or a wireless access device coupled to the robot cleaner through an external network.

In accordance with another embodiment, a method includes generating an image of a cleaning area to be cleaned by a robot cleaner, preparing a cleaning map based on the image, establishing communication link between a wireless terminal and the robot cleaner, and transmitting the image and cleaning map from the robot cleaner to the wireless terminal over the communication link. A request may be transmitted from the wireless terminal to the robot cleaner to receive the image and cleaning map.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with the features of any other embodiment.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner, comprising:
   at least one monitoring camera to generate a monitoring image of a cleaning area;
   an upward camera provided at an upper portion of the robot cleaner to capture an upper part and output an upper image;
   a controller to provide a cleaning map based on the upper image, and the controller to drive a robot cleaner; and
   a communicator to transmit the monitoring image and the cleaning map to an external device and to receive, from the external device, a control command for a specific location or area on the cleaning map,
   wherein the controller determines at least one characteristic point according to certain criteria, using the upper images captured at a first time and a second time through the upward camera during movement, and a movement ratio of the at least one characteristic point based on the movement of the robot cleaner is greater than a predetermined value, and a calculated height of the characteristic point is higher than a reference height, and wherein the controller generates the cleaning map using the determined characteristic point.

2. The robot cleaner of claim 1, further comprising:
   an image processor to compress the monitoring image and the cleaning map.

3. The robot cleaner of claim 1, further comprising:
   an authenticator to permit or block access to the external device.

4. The robot cleaner of claim 1, further comprising:
   a detector to detect an obstacle; and
   a location recognizer having at least one sensor to recognize a location of the robot cleaner, wherein the controller generates the cleaning map based on the detected obstacle and the location.

5. The robot cleaner of claim 4, further comprising:
   a display to display at least one of the monitoring image, information corresponding to the obstacle, information corresponding to the location, authentication information on the external device, or the cleaning map.

6. The robot cleaner of claim 1, wherein the control command is to control the monitoring camera or movement or orientation of the robot cleaner.

7. A system, comprising:
 a robot cleaner to generate a monitoring image of a cleaning area, wherein the robot cleaner includes an upward camera provided at an upper portion of the robot cleaner to capture an upper part and provide an upper image, and the robot cleaner to prepare a cleaning map based on the upper image; and
 a wireless terminal to receive the monitoring image and the cleaning map from the robot cleaner and to transmit, to the robot cleaner, a control command for a specific location or area on the cleaning map,
 wherein the robot cleaner includes:
  a controller to generate the cleaning map from the upper image and to drive the robot cleaner; and
  a communicator to transmit the monitoring image and the cleaning map to the wireless terminal and to receive the control command from the wireless terminal, wherein the controller determines at least one characteristic point according to certain criteria, using the upper images captured at a first time and a second time through the upward camera during movement of the robot cleaner, and a movement ratio of the characteristic point based on the movement of the robot cleaner is greater than a predetermined value, and a calculated height of the characteristic point is higher than a reference height, and wherein the controller prepares the cleaning map using the determined characteristic point.

8. The system of claim 7, wherein the robot cleaner further includes:
 an image processor to compress the monitoring image and the cleaning map.

9. The system of claim 7, wherein the robot cleaner further includes:
 an authenticator to permit or block access to the external device.

10. The system of claim 7, wherein the robot cleaner further includes:
 a detector to detect an obstacle; and
 a location recognizer having at least one sensor to recognize a location of the robot cleaner, wherein the controller generates the cleaning map based on the detected obstacle and the location.

11. The system of claim 7, wherein the wireless terminal includes:
 a user interface to display the cleaning map or the monitoring image and to receive the control command.

12. The system of claim 11, wherein the wireless terminal displays the monitoring image when a portion corresponding to a specific monitoring area in the cleaning map is selected while the cleaning map is displayed.

13. The system of claim 7, wherein the control command is to control the monitoring camera or movement or orientation of the robot cleaner.

14. The system of claim 7, further comprising:
 a wireless access device coupled between the robot cleaner and the wireless terminal or an external network.

15. The system of claim 7, wherein the wireless terminal includes a computer, a television, a smart phone, a portable phone, or a wireless access device coupled to the robot cleaner through an external network.

16. A method comprising:
 capturing an upper part and providing an upper image by a upward camera provided at an upper portion of a robot cleaner;
 generating a monitoring image of a cleaning area to be cleaned by at least one monitoring camera of the robot cleaner;
 preparing, by a controller of the robot cleaner, a cleaning map based on the upper image;
 transmitting, by a communicator of the robot cleaner, the monitoring image and the cleaning map to a wireless terminal over a communication link; and
 receiving, by the communicator of the robot cleaner and from the wireless terminal, a control command for a specific location or area on the cleaning map,
 wherein preparing the cleaning map includes determining at least one characteristic point according to certain criteria, using the upper images captured at a first time and a second time through the upward camera during movement, and a movement ratio of the characteristic point based on the movement of the robot cleaner is greater than a predetermined value, and a calculated height of the characteristic point is higher than a reference height, and wherein preparing the cleaning map includes providing the cleaning map using the determined characteristic point.

* * * * *